D. H. HAYDEN.
TOOL FOR TWISTING WIRE TIES.
APPLICATION FILED DEC. 14, 1914.
1,209,434. Patented Dec. 19, 1916.
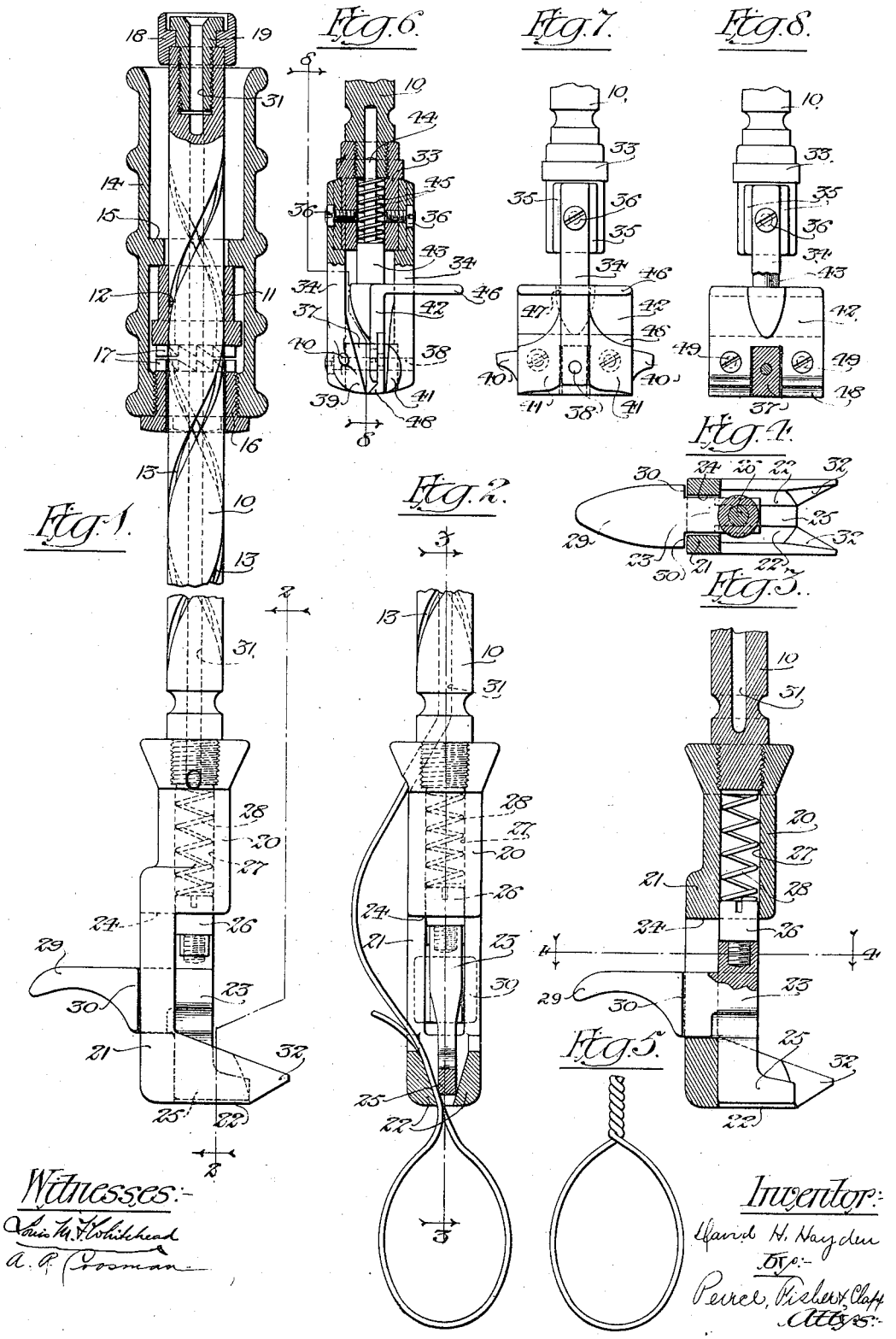

UNITED STATES PATENT OFFICE.

DAVID H. HAYDEN, OF NEW YORK, N. Y.

TOOL FOR TWISTING WIRE TIES.

1,209,434.     Specification of Letters Patent.     Patented Dec. 19, 1916.

Application filed December 14, 1914. Serial No. 877,098.

*To all whom it may concern:*

Be it known that I, DAVID H. HAYDEN, a citizen of the United States, and a resident of New York, county and State of New York, have invented certain new and useful Improvements in Tools for Twisting Wire Ties.

The invention relates to tools for twisting wire ties and seeks to provide a simple and effective portable hand tool by which the ends of a wire tie can be quickly twisted together.

The invention consists in the features of improvement hereinafter set forth, illustrated in different modified forms in the accompanying drawings and more particularly pointed out in the appended claims.

Figure 1 is a view partially in elevation and partially in longitudinal section, of the preferred form of the improved tool. Fig. 2 is an elevation of the lower end of the tool with parts in section on the line 2—2 of Fig. 1, and showing the jaw members engaging the ends of the tie wire. Fig. 3 is a longitudinal section on line 3—3 of Fig. 2. Fig. 4 is a horizontal section on the line 4—4 of Fig. 3. Fig. 5 shows the complete tie. Fig. 6 is a view partly in longitudinal section and partly in side elevation of the lower end of the tool, illustrating a modified arrangement of the jaw members. Fig. 7 is a view in side elevation of the parts shown in Fig. 6 and taken at right angles to Fig. 6. Fig. 8 is a view of the modified form with parts shown in section on the line 8—8 of Fig. 6.

The improved tool comprises a spindle 10 which is rotated by means of a longitudinally shiftable nut 11 having a lug 12 thereon which is arranged to engage reversely arranged threads 13 of sharp pitch formed in the cylindrical surface of the spindle. The nut is shifted in axial direction by means of a sleeve-like handle 14, which surrounds the spindle and nut and which is provided with an inwardly projecting, annular shoulder or flange 15 that engages the upper or outer end of the nut 12. A bushing 16 threaded into the lower or inner end of the handle 14 is arranged to engage the nut, locking it to the handle. Preferably as shown, the bushing 16 is provided at its upper end with ratchet teeth 17 which coöperate with similar ratchet teeth 17 formed upon the adjacent end of the nut. By drawing the handle toward the upper or outer end of the spindle the ratchet teeth on the bushing 16 will engage the ratchet teeth on the nut to thereby hold the nut against rotation. Then the nut as it is drawn outwardly rotates the spindle by its engagement with the screwthreads thereof. The spindle can also be rotated by oscillating the handle back and forth. As the handle is oscillated in one direction, the teeth of the bushing 16 will pass idly over the teeth of the nut, but, as the handle is oscillated in the opposite direction, the teeth can be engaged to thereby rotate the nut and spindle.

At its upper, outer end the spindle is preferably provided with a knob 18 which is fixed upon the end of the spindle and is rotatably held in place by the head screw 19.

In the form shown in Figs. 1, 2, 3 and 4, the lower, reduced end of the spindle is threaded into the upper, enlarged or flanged end of a head 20. This head is provided with a fixed jaw member, which in the preferred form shown comprises a shank 21 and two laterally disposed fixed jaws 22, the shank and jaws being formed in a piece with the head 20. As shown, the shank is preferably offset on one side of the axis 20 and spindle 10, and the jaws 22 project laterally from the lower end of the shank 21, the jaws being substantially parallel and provided with oppositely inclined, converging inner faces.

A second jaw member is movably mounted on the head 20 to slide in axial direction to and from the fixed jaws 22. This jaw member comprises a body portion 23, which extends through a vertical slot 24 formed in the shank 21. This jaw member is provided with a depending foot or jaw 25, which is arranged between converging inner faces of the fixed jaws 22 and coöperates therewith to grip the opposite ends of the tie wire. A screw 26 is threaded into an upwardly projecting portion of the movable jaw 23, and is provided with a cylindrical head that extends within the cylindrical bore 27 extending through the head 20. A coil-spring arranged in the bore 27 between the screw 26 and the lower end of the spindle forces the movable jaw member 23 toward the fixed jaws 22 and holds it in normal position with the rear portion of the jaw member 23 engaging the lower end of the slot 24. The ends of this slot serve to limit the movement of the jaw member 23.

The rear portion of the jaw member 23 is provided with a laterally projecting finger-piece 29. The inner portion of this finger-piece is slightly wider than the main body of the jaw member 23, as shown most clearly in Fig. 4, so that shoulders 30 are formed which overlap and abut against the rear face of the shank 21. The jaw members are assembled before the spindle 10 is threaded into the head 20. The jaw member 23 is first inserted through the slot 24 of the shank 21 on the rear side thereof, and the screw 26 is then inserted through the bore 27 and threaded into the upper portion of the jaw member 23. The spring 28 is then placed in the bore 27 and the lower, reduced end of the spindle 10 is threaded into the upper end of the bore.

The spindle 10 and the screw 19 threaded into its upper end are preferably provided with a longitudinal bore 31 through which a length of wire for forming the ties is passed. This bore opens as shown on one side of the head 20 immediately below its enlarged upper end. From thence the wire is passed between the movable foot or jaw 25 and one of the fixed jaws 22, around the article or articles to be bound and then back between the jaws, as shown in Fig. 2. By means of the finger-piece 29, the movable jaw member 23 can be conveniently lifted or shifted against the tension of the spring 28 so that the tie wire can be readily passed through the openings between the jaw members and around the article or articles to be bound. To facilitate the passing of the tie through the openings between the jaw member the fixed jaws 22 are preferably provided at their ends with guiding prongs 32. These prongs, as most clearly shown in Fig. 4, are provided with inclined inner faces which converge toward the jaw openings and thereby serve to guide the end of the tie to proper position between the fixed and movable jaws.

When the jaw member 23 is released, the spring 28 forces it outwardly toward the fixed jaws 22 to thereby firmly grip the ends of the tie wire. Both ends of the tie are preferably passed between the movable jaw and one of the fixed jaws. Two jaw openings are provided for convenience, as for example, for right and left-handed operators. Moreover, the movable jaw has some lateral play in the guide slot 24, so that when the ends of the tie are gripped between it and one of the fixed jaws, the lower working end of the movable jaw will be forced against the other fixed jaw, as shown in Fig. 2, and the latter then acts as a guiding abutment and holds the movable jaw in position to securely and positively grip the ends of the tie wire. The inclined, converging working faces of fixed jaws act as abutments and aid in effecting the positive grip of the spring-pressed movable jaw upon the tie wire, and the construction is such that any pull exerted on the spindle tends to tighten the grip. The spindle and jaw members are then rotated through the medium of the nut 11 and handle 14, as described, to twist the ends of the tie together. Soft annealed wire is used for the tie, and as the ends are thus twisted together, the operator places considerable tension upon the same and the final twisting operation will serve to twist off or separate the tie wires at a point adjacent the jaws so that a completed tie, such as shown in Fig. 5, is formed, either from a short piece of wire or from a continuous length of wire.

In the modified form shown in Figs. 6, 7 and 8, the lower, reduced end of the spindle 10 is threaded into the upper end of a sleeve-like head 33, and a jaw member and an abutment member are secured to and dependent from the sleeve 33. These members are provided with shanks 34, the upper ends of which extend between positioning ribs 35 on the sleeve 33 and are secured to the sleeve by screws 36. A block or spacing member 37 is fixed between the lower ends of the shanks 34 and is held in place by a screw 38 extending through these parts. On opposite sides of the spacing block 37 the jaw member is provided with two fixed jaws 39 projecting laterally in opposite directions and having inclined inner faces so that beveled gripping edges are formed at the lower portions of the jaws. These jaws terminate in prongs 40 which serve to guide the ends of the tie wire to the proper position for twisting by the tool. The abutment member, like the jaw member, is T-shaped and is provided with laterally projecting abutments 41. An axially sliding jaw member 42 is provided with a cylindrical portion 43, which is loosely guided within the bore of the sleeve 33. It is also provided with a reduced shank 44 guided within a socket formed in the lower end of the spindle 10. A spring 45 is coiled about the shank 44 and is arranged between the end of the spindle pin and the end of the cylinder portion 43.

The movable jaw member is provided with a laterally projecting finger-piece 46 having an opening 47 therein through which the shank 34 of the abutment member extends. The lower portion of the movable jaw member is of inverted U-shape, as most clearly shown in Fig. 8, and is provided with portions extending downwardly on opposite sides of the separating block 37. A U-shaped gripping member or jaw 48 is secured to the lower portion of the jaw member 42 by screws 49. This gripping member or jaw is preferably formed of hardened steel and is provided at its lower portion with beveled gripping edges which project toward the gripping edges of the fixed jaws 39. The projecting abutments 41 are preferably provided with inner inclined guiding faces for the movable jaw to maintain the latter in proper position relatively to the fixed jaw to securely and positively grip the ends of the tie wire. The operation of this form is similar to that already described.

It is obvious that changes may be made in the details set forth without departure from the essentials of the invention as defined in the claims.

I claim as my invention:—

1. A tool for twisting wire ties, comprising a spindle, means for rotating said spindle, coöperating jaw members for gripping the ends of the wire mounted on said spindle, one of said jaw members being fixed to the spindle, and the other movably mounted thereon and spring-pressed toward said fixed jaw member and a finger piece for shifting said movable jaw member away from said fixed jaw member.

2. A tool for twisting wire ties comprising a spindle, means for rotating said spindle, a jaw fixed to said spindle, a coöperating jaw movably mounted thereon and spring-pressed toward said fixed jaw member, and a guiding abutment for said movable jaw, the working portion of said movable jaw being arranged between said fixed jaw and said abutment.

3. A tool for twisting wire ties comprising a threaded spindle, a shiftable nut for rotating said spindle, a head fixed to said spindle having two laterally projecting fixed jaws, and a jaw member movably mounted on said head and coöperating with said fixed jaws to grip the ends of the tie wire.

4. A tool for twisting wire ties comprising a spindle, means for rotating the same, a head on said spindle having a fixed jaw, and a jaw member guided to slide axially on said head, spring-pressed toward said fixed jaw and arranged to coöperate therewith to grip the ends of the tie wire said jaws having working edges transverse to the axis of said spindle.

5. A tool for twisting wire ties comprising a spindle, means for rotating the same, a head on said spindle having a fixed jaw, and a jaw member movably mounted on said head, provided with a projecting finger-piece and arranged to coöperate with said fixed jaw to grip the ends of the tie wire said jaws having working edges transverse to the axis of said spindle.

6. A tool for twisting wire ties comprising a spindle, means for rotating the same, a head on said spindle having two laterally disposed fixed jaws, a movable jaw member guided to slide axially on said head and spring-pressed toward said fixed jaws, said movable jaw having a laterally projecting finger-piece, and said fixed jaws having projecting prongs for guiding the ends of the tie wire to the openings between said jaws.

7. A tool for twisting wire ties, comprising a rotatable spindle, a jaw member on said spindle having two laterally-disposed substantially parallel jaws, and a second jaw member on said spindle arranged between said parallel jaws, and coöperating therewith to grip the ends of the wire.

8. A tool for twisting wire ties comprising a spindle, means for rotating said spindle, and jaw members mounted on the end of said spindle to rotate therewith, one of said jaw members having two laterally-disposed, substantially parallel, fixed jaws, and the other jaw member being movably mounted and having a working portion arranged between said fixed jaws.

9. A tool for twisting wire ties comprising a spindle, means for rotating said spindle, and jaw members mounted on the end of said spindle to rotate therewith, one of said jaw members having two laterally-disposed, substantially parallel, fixed jaws having inclined converging inner faces, and the other jaw member being movably mounted and spring-pressed toward said fixed jaws and having a working portion arranged between the converging faces of said fixed jaws and coöperating therewith to grip the ends of the tie wire.

10. A tool for twisting wire ties, comprising a spindle, means for rotating said spindle, and jaw members and a guiding abutment mounted on the end of said spindle to rotate therewith, one of said jaw members having a transversely disposed fixed jaw provided with an inclined working face, and the other jaw being spring-pressed and guided to slide axially to and from said fixed jaw and having a working portion arranged between said fixed jaw and said abutment.

11. A tool for twisting wire comprising a spindle, means for rotating said spindle, cooperating jaws mounted on said spindle and having working edges transverse to the axis thereof for gripping the ends of the tie wire, a spring for holding said jaws in closed position, and a laterally projecting, axially movable finger piece for opening said jaws.

12. A tool for twisting wire ties comprising a spindle, means for rotating the same, coöperating jaws mounted on said spindle and having working edges transverse to the axis thereof for gripping the ends of the tie wire, one of said jaws being fixed to said spindle and the other axially movable to and from said fixed jaw, a spring for pressing said movable jaw toward said fixed jaw, and a laterally projecting finger piece for shifting said movable jaw to open position.

DAVID H. HAYDEN.

Witnesses:
 B. A. BRICKLEY,
 WILLIAM P. FRENCH.